US 9,470,282 B2

(12) United States Patent
Jeong et al.

(10) Patent No.: US 9,470,282 B2
(45) Date of Patent: Oct. 18, 2016

(54) ELECTRO-MECHANICAL BRAKE

(71) Applicant: Daegu Gyeongbuk Institute of Science and Technology, Dalseong-gun, Daegu (KR)

(72) Inventors: Choong Pyo Jeong, Daegu (KR); Dong Hwan Shin, Daegu (KR); Tae Sang Park, Daegu (KR); Sung Ho Jin, Daegu (KR)

(73) Assignee: Daegu Gyeongbuk Institute of Science and Technology, Daegu (KR)

( * ) Notice: Subject to any disclaimer, the term of this patent is extended or adjusted under 35 U.S.C. 154(b) by 101 days.

(21) Appl. No.: 14/538,926

(22) Filed: Nov. 12, 2014

(65) Prior Publication Data

US 2015/0362034 A1 Dec. 17, 2015

(30) Foreign Application Priority Data

Jun. 11, 2014 (KR) .................. 10-2014-0070824

(51) Int. Cl.
*F16D 65/52* (2006.01)
*F16D 55/225* (2006.01)
*F16D 55/226* (2006.01)
*F16D 65/54* (2006.01)
*F16D 55/00* (2006.01)

(52) U.S. Cl.
CPC ............. *F16D 65/52* (2013.01); *F16D 55/225* (2013.01); *F16D 55/226* (2013.01); *F16D 65/54* (2013.01); *F16D 2055/0008* (2013.01); *F16D 2055/0016* (2013.01)

(58) Field of Classification Search
CPC .... F16D 65/52; F16D 55/2265; F16D 55/08; B60T 13/74
See application file for complete search history.

(56) References Cited

U.S. PATENT DOCUMENTS

| | | | | |
|---|---|---|---|---|
| 3,405,785 A | * | 10/1968 | Schmid | F16D 55/2255 188/106 F |
| 3,662,864 A | * | 5/1972 | Evans | F16D 55/2255 188/72.2 |
| 3,727,727 A | * | 4/1973 | Hauth | F16D 55/226 188/72.2 |
| 3,900,083 A | * | 8/1975 | Hauth | F16D 55/226 188/71.9 |

(Continued)

FOREIGN PATENT DOCUMENTS

KR 10-2011-0062873 A 6/2011

OTHER PUBLICATIONS

Dong-Hwan Shin et al. "Study for Mechanism for Wear Adjustment with Electro Wedge Brake" 5th International Conference of Asian Society for Precision Engineering and Nanotechnology (ASPEN 2013), Nov. 13-15, 2013.

*Primary Examiner* — Robert A Siconolfi
*Assistant Examiner* — James Hsiao
(74) *Attorney, Agent, or Firm* — Sughrue Mion, PLLC (57) ABSTRACT

Provided is an electro-mechanical brake having a wear compensation function including a carrier fixed to a vehicle body, a brake disk rotatably installed in a wheel of a vehicle, a pad unit including an inner pad disposed on one side of the disk and an outer pad disposed on the other side of the disk, a moving unit configured to move the pad unit in a direction toward the disk, and a wear compensating unit installed between the carrier and the moving unit and moving the pad unit in the direction toward the disk through the moving unit when the pad unit wears in order to maintain the corresponding state, wherein a distance between the pad unit and the disk is maintained within a predetermined distance by the wear compensating unit.

15 Claims, 10 Drawing Sheets

(56) References Cited

U.S. PATENT DOCUMENTS

| | | | | |
|---|---|---|---|---|
| 4,014,411 A * | 3/1977 | Troester | F16D 65/18 | 188/196 BA |
| 4,256,206 A * | 3/1981 | Maehara | F16D 65/18 | 188/196 D |
| 4,457,408 A * | 7/1984 | Montalvo, III | F16D 55/224 | 188/170 |
| 4,606,437 A * | 8/1986 | Mikina | F16D 55/228 | 188/72.4 |
| 4,784,244 A * | 11/1988 | Carre | B60T 13/741 | 188/156 |
| 4,809,823 A * | 3/1989 | Fargier | B60T 8/32 | 188/180 |
| 5,325,949 A * | 7/1994 | Dommett | F16D 13/75 | 188/196 A |
| 5,984,068 A * | 11/1999 | Reed, Jr. | F16D 28/00 | 192/111.12 |
| 6,752,247 B2 * | 6/2004 | Hartsock | B60T 13/74 | 188/156 |
| 6,978,868 B2 * | 12/2005 | Schautt | B60T 13/741 | 188/70 B |
| 7,143,873 B2 * | 12/2006 | Pascucci | B60T 7/107 | 188/136 |
| 7,815,021 B2 * | 10/2010 | Baumgartner | F16D 65/14 | 188/72.7 |
| 7,958,974 B2 * | 6/2011 | Baumgartner | F16D 65/18 | 188/70 B |
| 8,214,119 B2 * | 7/2012 | Kim | F16D 65/18 | 188/343 |
| 8,240,438 B2 * | 8/2012 | Baumgartner | F16D 55/225 | 188/250 G |
| 2004/0035649 A1 * | 2/2004 | Juneau | F16D 65/18 | 188/72.7 |
| 2006/0131113 A1 * | 6/2006 | Christof | B60T 7/045 | 188/72.1 |
| 2006/0175163 A1 * | 8/2006 | Severinsson | B60T 13/743 | 188/265 |
| 2008/0190717 A1 * | 8/2008 | Baumann | F16D 65/18 | 188/156 |
| 2010/0044165 A1 * | 2/2010 | Argirovski | F16D 55/2245 | 188/71.8 |
| 2011/0100768 A1 * | 5/2011 | Baumgartner | B60T 13/741 | 188/72.2 |
| 2012/0103733 A1 * | 5/2012 | Sekiguchi | F16D 65/18 | 188/72.1 |

* cited by examiner

ELECTRO-MECHANICAL BRAKE

CROSS-REFERENCE TO RELATED APPLICATIONS

This application claims priority under 35 U.S.C. §119 to Korean Patent Application No. 10-2014-0070824, filed on Jun. 11, 2014, the disclosure of which is incorporated herein by reference in its entirety.

TECHNICAL FIELD

The present invention relates to an electro-mechanical brake having a wear compensation function and, more particularly, to an electro-mechanical brake (EMB) having a wear compensation function to maintain a distance between a pad unit and a disk when the pad unit wears, by using a mechanical structure.

BACKGROUND

Recently, electric vehicles driven with electricity as a power source, compared with vehicles driven with an engine, have been developed due to depletion of oil fuels, growing environmental restrictions, and for the purpose of enhancing fuel efficiency.

Thus, vehicle components using an electric motor have been researched, and development of electro-mechanical brake (EMB) technologies based on a braking scheme using a motor and a mechanical element have been ongoing.

Brake-by-wire, a higher concept, includes an electronic pedal, a wiring, a controller, and an EMB and is advantageous in that it can be configured with a smaller amount of components and a braking distance can be reduced through fast braking responsiveness, compared with an existing hydraulic brake system composed of a pedal, a hydraulic booster, a master cylinder, a hydraulic pipe, and a hydraulic caliper.

The existing hydraulic brake obtains clamping force required for braking by amplifying force.

First, force exerted as a driver steps on a pedal is amplified based on the principle of the lever, and secondly, force is additionally amplified by a hydraulic booster by using vacuum pressure generated in an intake stroke of an engine.

The amplified force is converted into hydraulic pressure in a master cylinder, and the hydraulic pressure is transmitted to a slave cylinder of a caliper.

The same hydraulic pressure is formed in the master cylinder and the slave cylinder of the caliper, and in the slaver cylinder of the caliper having a greater diameter, force corresponding to a ratio of a sectional area to that of the master cylinder is additionally amplified based on the Pascal's principle.

The force amplified three times pushes the piston to act as clamping force on a disk.

An EMB also requires a high output motor that may be able to provide high torque to provide strong clamping force such as that of a hydraulic brake.

A wedge-type EMB utilizing a self-servo effect of a mechanism, while using a low output motor has also been proposed.

As for implementation of a wear compensation function, in the case of an existing hydraulic brake, an oil seal positioned between a hydraulic piston and a cylinder serves to uniformly maintain a distance between a disk and a brake pad regardless of wear of the brake pad.

In contrast, in the case of EMB, since an oil seal is not present, a high-priced displacement sensor, or the like, which may be able to uniformly maintain a distance between a disk and a brake pad is installed to perform a wear compensation function, increasing costs of products.

RELATED ART DOCUMENT (Patent Document) Korean Patent Laid-Open Publication No. 10-2011-0062873

SUMMARY

Accordingly, the present invention provides an electro-mechanical brake (EMB) having a wear compensation function to uniformly maintain a distance between a pad unit and a disk when the pad unit wears, by using a mechanical structure without a high-priced sensor.

In one general aspect, an electro-mechanical brake (EMB) having a wear compensation function includes: a carrier fixed to a vehicle body; a brake disk rotatably installed in a wheel of a vehicle; a pad unit including an inner pad disposed on one side of the disk and an outer pad disposed on the other side of the disk; a moving unit configured to move the pad unit in a direction toward the disk; and a wear compensating unit installed between the carrier and the moving unit and configured to move the pad unit in the direction toward the disk through the moving unit when the pad unit wears, and maintain the corresponding state, wherein a distance between the pad unit and the disk is maintained within a predetermined distance by the wear compensating unit.

The moving unit may include: a driving unit coupled to the inner pad in the other end thereof and moving the inner pad in a direction of the other end where the disk is disposed; a caliper disposed such that one end thereof is spaced apart from one end of the driving unit and the other end is coupled to the outer pad; oval members disposed between one end of the driving unit and one end of the caliper and rotatably coupled to the carrier; and a link member having one end coupled to the oval members and the other end coupled to the driving unit, wherein when the inner pad is moved by the driving unit in the direction toward the disk, the link member moves together with the inner pad in the direction toward the disk to rotate the oval members, and the caliper moves the outer pad in the direction toward the disk according to the rotation of the oval members.

The driving unit may include: a wedge unit having a first sloped surface formed on one surface thereof and the other surface coupled to the inner pad; a driving housing having one surface in contact with the oval members and a second sloped surface formed on the other surface thereof and being in contact with the first sloped surface of the wedge unit; and a power generating unit installed in the driving housing and configured to enable the wedge unit to move on the second sloped surface, wherein the other end of the link member is coupled to the wedge unit, and when the wedge unit moves on the second sloped surface in the direction toward the disk, the link member moves together with the wedge unit in the direction toward the disk.

The power generating unit may include: a motor installed in the driving housing; a shaft coupled to a rotational shaft of the motor and having a thread formed on an outer circumferential surface thereof; and a connection unit connected to the wedge unit in one end thereof and screw-coupled to the shaft in the other end thereof, wherein when the shaft is rotated by the motor, the connection unit moves along the shaft and, according to the movement of the connection unit, the wedge unit moves on the second sloped surface in the movement direction of the connection unit and simultaneously moves in the direction toward the disk.

One end of the link member is coupled to a position eccentric from the center of the oval members.

The wear compensating unit may be disposed between the carrier and the link member and, when the pad unit wears, the wear compensating unit maintains a state in which the driving unit and the pad unit has moved in the direction of the disk, through the link member which has moved in the direction of the disk.

When the link member has moved in the direction of the disk by more than a predetermined distance, the wear compensating unit restrains the link member from moving in the opposite direction of the disk.

The wear compensating unit may include: a rotary bar rotatably coupled to the carrier in one end thereof; a plurality of insertion holes formed on the link member and allowing the other end of the rotary bar to be inserted thereinto; an elastic member applying rotary power to the rotary bar in the opposite direction of the disk; and a stopper configured to limit a rotation angle of the rotary bar which rotates in the opposite direction of the disk, wherein when the link member has moved in the direction of the disk by more than the predetermined distance, the other end of the rotary bar may be inserted into the insertion recess and supported by the stopper to restrain the link member from moving in the opposite direction of the disk.

The elastic member may be a torsion spring.

Other features and aspects will be apparent from the following detailed description, the drawings, and the claims.

DETAILED DESCRIPTION OF EMBODIMENTS

Hereinafter, embodiments of the present invention will be described in detail with reference to the accompanying drawings.

Figure 1:
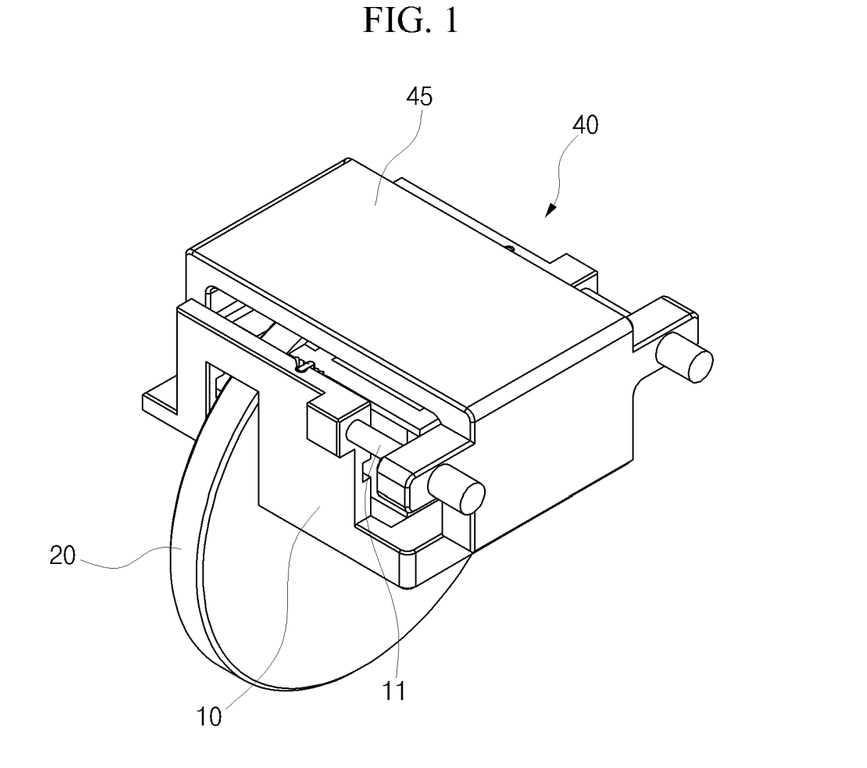
FIG. 1 is a perspective view of an electro-mechanical brake (EMB) having a wear compensation function according to an embodiment of the present invention.
Figure 2:
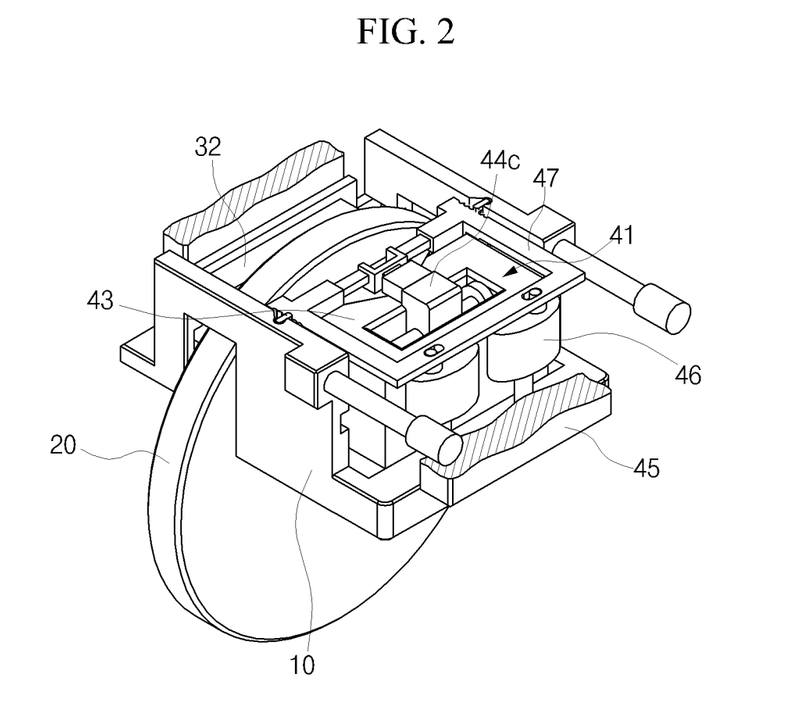
FIG. 2 is a perspective view illustrating a state in which a caliper is partially cut in one direction in FIG. 1.
Figure 3:
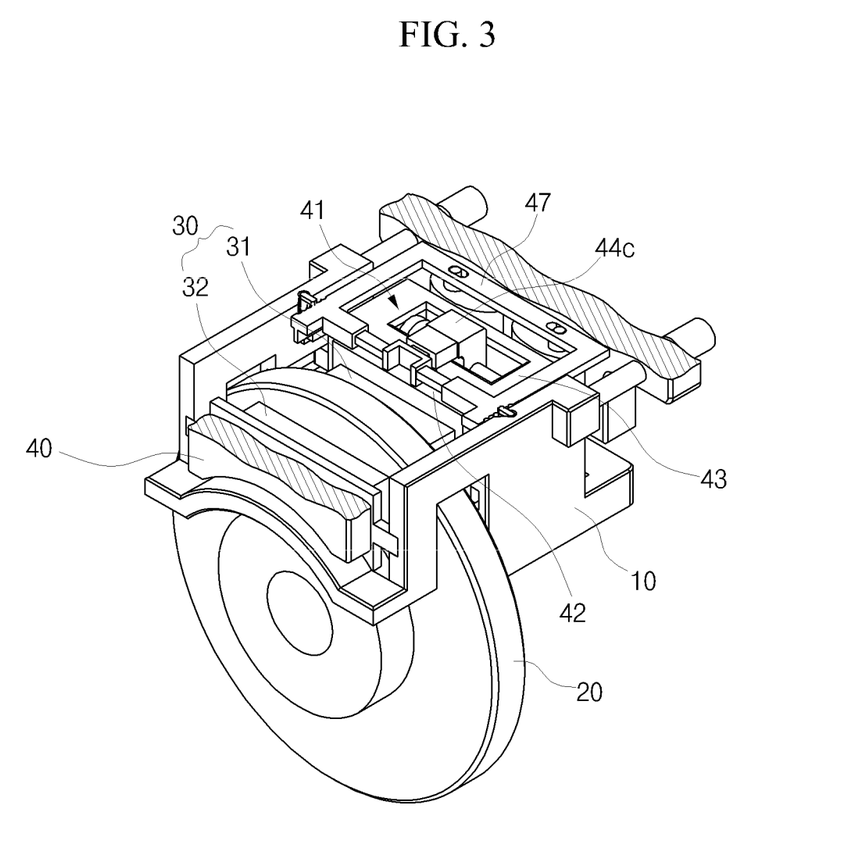
FIG. 3 is a perspective view illustrating a state in which a caliper is partially cut in the other direction in FIG. 1.
Figure 4:
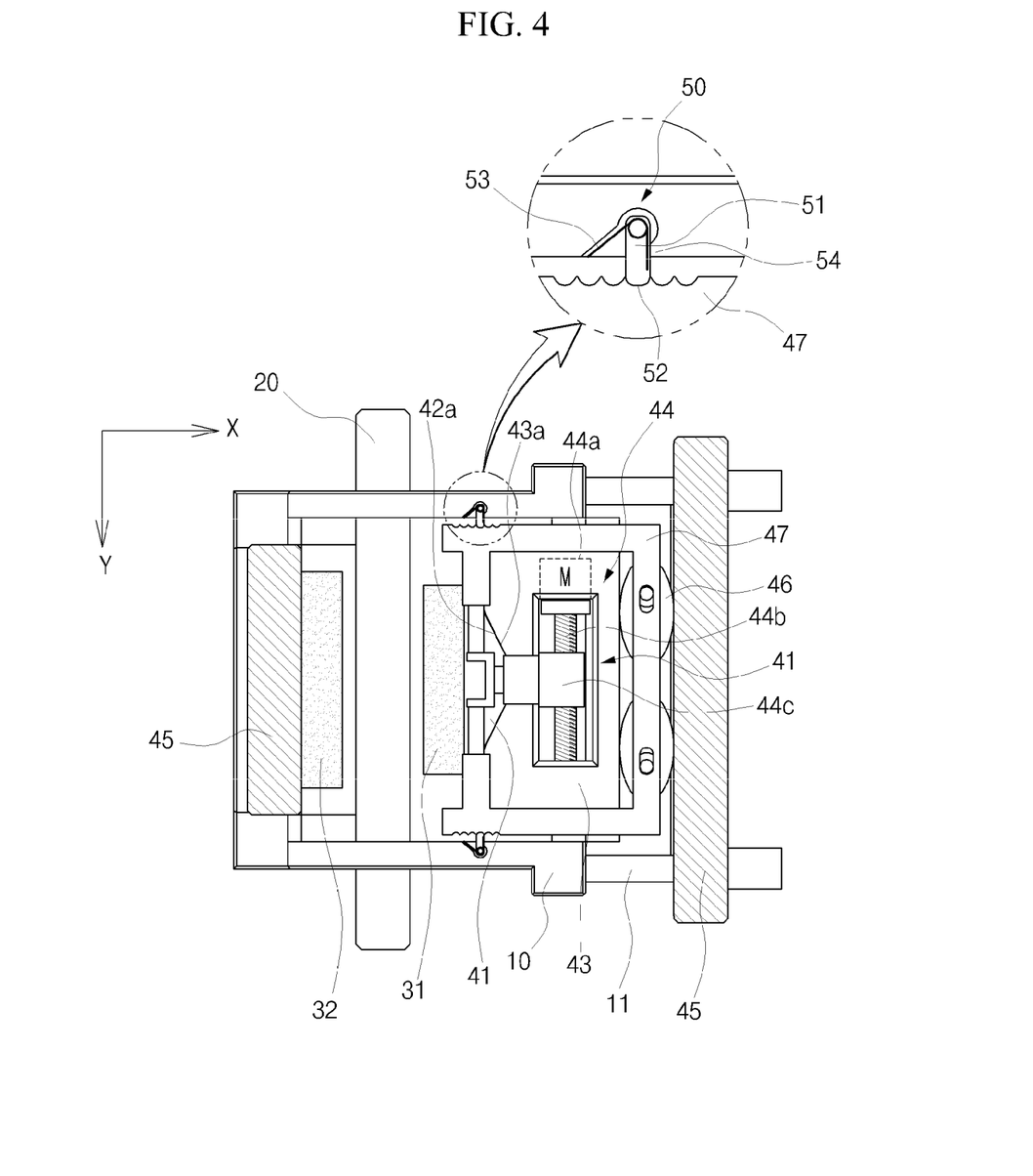
FIG. 4 is a plan view of FIG. 2.
Figure 5:
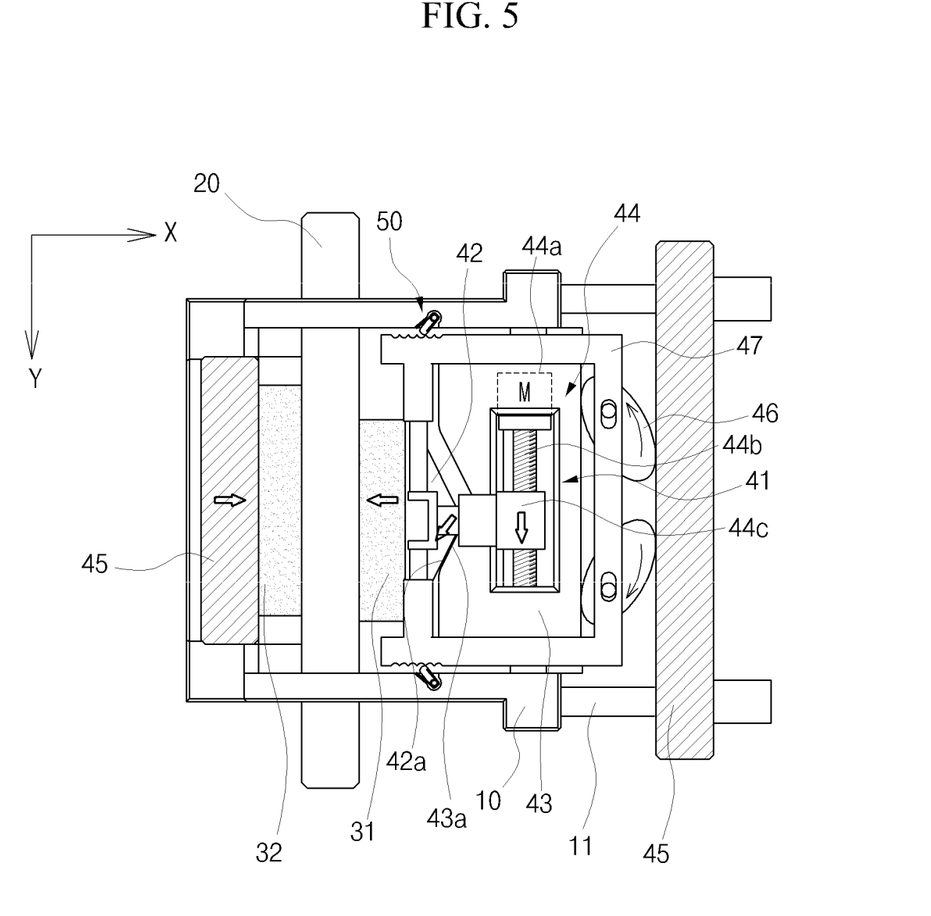
FIG. 5 is a plan view illustrating a state in which a link member is moved in a direction toward a disk by a driving unit in FIG. 4.
Figure 6:
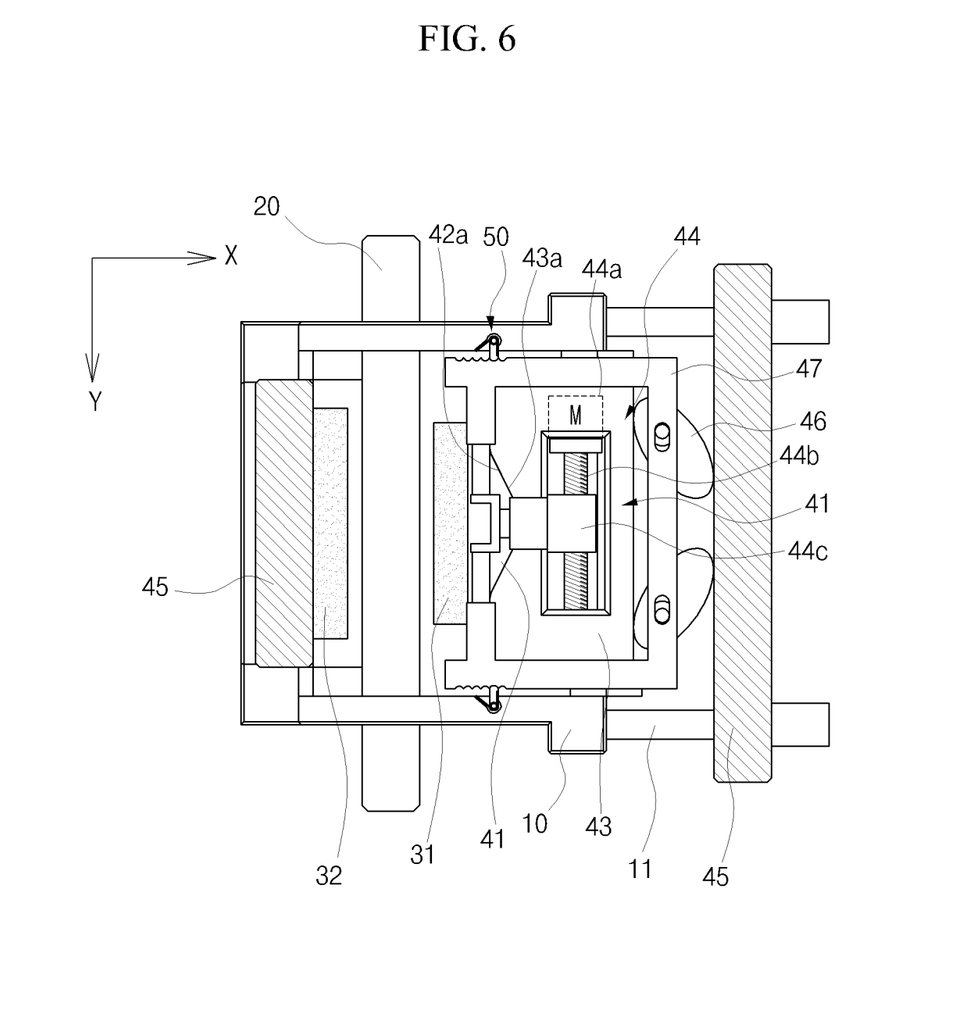
FIG. 6 is a plan view illustrating a state in which a wear compensating unit operates as a pad portion wears in FIG. 5.

FIG. 1 is a perspective view of an electro-mechanical brake (EMB) having a wear compensation function according to an embodiment of the present invention, FIG. 2 is a perspective view illustrating a state in which a caliper is partially cut in one direction in FIG. 1, FIG. 3 is a perspective view illustrating a state in which a caliper is partially cut in the other direction in FIG. 1, FIG. 4 is a plan view of FIG. 2, FIG. 5 is a plan view illustrating a state in which a link member is moved in a direction toward a disk by a driving unit in FIG. 4, FIG. 6 is a plan view illustrating a state in which a wear compensating unit operates as a pad portion wears in FIG. 5, and FIGS. 7A through 7D are plan views illustrating a process of operating a wear compensating unit according to a movement of a link member in an electro-mechanical brake having a wear compensation function according to an embodiment of the present invention.

As illustrated in FIGS. 1 to 7D, an EMB having a wear compensation function according to an embodiment of the present invention includes a carrier 10, a disk 20, a pad unit 30, a moving unit 40, and a wear compensating unit 50.

The carrier 10 is fixed to a vehicle body.

A guide bar 11 is formed in the carrier 10.

The disk 20 is a brake disk which is installed in a wheel of a vehicle and rotates.

The pad unit 30, which is in contact with the disk 20 to reduce rotary power of the disk 20, includes an inner pad 31 disposed on one side of the disk 20 and an outer pad 32 disposed on the other side of the disk 20.

The moving unit 40 serves to move the pad unit 30 in a direction toward the disk 20.

The moving unit 40 includes a driving unit 41, a caliper 45, oval members 46, and a link member 47.

The driving unit 41 is coupled to the inner pad 31 in the other end thereof to move the inner pad 31 in a direction of the other end where the disk 20 is disposed.

In the present embodiment, the driving unit 41 includes a wedge unit 42, a driving housing 43, and a power generating unit 44.

The wedge unit 42 has a first sloped surface 42a formed on one surface thereof in the opposite direction of the disk 20, and the other surface of the wedge unit 42 in the direction of the disk 20 is coupled to the inner pad 31.

The driving housing 43 is in contact with the overall member 46 on one surface thereof, and a second sloped surface 43a in contact with the first sloped surface 42a of the wedge unit 42 is formed on the other surface of the driving housing 43.

The driving housing 43 is installed in the carrier 10 such that the driving housing 43 is movable in an X axis direction.

The power generating unit 44 is installed in the driving housing 43 and generates power to enable the first sloped surface 42a of the wedge unit 42 to move on the second sloped surface 43a.

The power generating unit 44 includes a motor 44a, a shaft 44b, and a connection unit 44c.

The motor 44a is installed in the driving housing 43.

The shaft 44b is coupled to a rotational shaft of the motor 44a and has a thread formed on an outer circumferential surface thereof.

The shaft 44b is disposed in a Y axis direction perpendicular to a movement direction of the pad unit 30.

The connection unit 44c is coupled to the wedge unit 42 in one end thereof and screw-coupled to the shaft 44b in the other end thereof.

Here, the wedge unit 42 is coupled to the connection unit 44c such that it is drawn out in the X axis direction through a withdrawal bar, or the like.

Accordingly, when the shaft 44b is rotated by the motor 44a, the connection unit 44c linearly moves along the shaft 44b in the Y axis direction, and according to the movement of the connection unit 44c, the wedge unit 42 moves in the X axis direction, a movement direction of the connection unit 44c, on the second sloped surface 43a and simultaneously moves in the Y axis direction, a direction of the disk 20.

One end of the caliper 45 is disposed to be spaced apart from one end of the driving unit 41, specifically, one end of the driving housing 43, and the other end thereof is coupled to the outer pad 32.

The caliper 45 is disposed above the disk 20 such that one end thereof is disposed to be in contact with the oval members 46 on one side of the disk 20 and the other end thereof is disposed to be coupled to the outer pad 32 on the other side of the disk 20.

The oval members 46 are disposed between one end of the driving housing 43 and one end of the caliper 45 which are spaced apart from one another.

The oval members 46 are rotatably coupled to the carrier 10 in a central portion thereof and are in contact with one end of the driving housing 43 and one end of the caliper 45.

The link member 47 is coupled to the oval members 46 in one end thereof and coupled to the driving unit 41 in the other end.

In detail, one end of the link member 47 is coupled to a position eccentric with respect to a rotation central axis of the oval members 46.

Thus, when the link member 47 moves in the X axis direction, the oval members 46 rotate based on the rotation central axis coupled to the carrier 10.

The other end of the link member 47 is coupled to the wedge unit 42.

Here, the wedge unit 42 is coupled to the other end of the link member 47 such that it is drawn out in the X axis direction through a withdrawal bar, or the like.

Accordingly, the wedge unit 42 may be drawn out in the X axis direction and the Y axis direction from the connection unit 44c and the link member 47 so as to be movable.

As the wedge unit 42 moves in the direction of the disk 20, namely, in the X axis direction, on the second sloped surface 43a of the driving housing 43, the link member 47 coupled to the wedge unit 42 also moves in the X axis direction in which the disk 20 is disposed, and accordingly, the oval members 46 rotate.

As the oval members 46 rotate, one end of the carrier 10 in contact with the oval members 46 moves in a direction away from the disk 20, and accordingly, the outer pad 32 coupled to the other end of the carrier 10 moves in the direction of the disk 20.

The wear compensating unit 50 is disposed between the carrier 10 and the moving unit 40. When the pad unit 30 wears, the wear compensating unit 50 moves the pad unit 30 in the direction toward the disk 20 through the moving unit 40 by an amount of wear of the pad unit 30, and maintains the state.

In detail, the wear compensating unit 50 is disposed between the carrier 10 and the link member 47, and when the pad unit 30 wears, the wear compensating unit 50 moves the link member 47 to be adjacent to the pad unit 30 by an amount of wear of the pad unit 30, and maintains the state in which the driving unit 41 and the pad unit 30 have moved in the direction toward the disk 20.

Accordingly, the pad unit 30 and the disk 20 are maintained within a predetermined distance therebetween.

That is, when the link member 47 has moved in the direction of the disk 20 by more than a predetermined distance, the wear compensating unit 50 restrains the link member 47 from moving in the opposite direction of the disk 20, thus allowing the pad unit 30 and the disk to be maintained within the predetermined distance therebetween.

In the present embodiment, the wear compensating unit 50 includes a rotary bar 51, an insertion recess 52, an elastic member 53, and a stopper 54.

One end of the rotary bar 51 is rotatably coupled to the carrier 10 and the other end thereof is disposed in the direction of the link member 47.

A plurality of insertion recesses 52 are provided on the link member 47 and the other end of the rotary bar 51 is inserted thereinto.

The elastic member 53 is installed in the carrier 10 to apply rotary power to the rotary bar 51 in a direction opposite the direction in which the disk 20 is disposed.

The elastic member 53 may have various shapes and structures. In the present embodiment, the elastic member 53 is configured as a torsion spring.

Owing to elastic force of the elastic member 53 configured as a torsion spring, the rotary bar 51 is forced to rotate in the direction opposite the direction in which the disk 20 is disposed.

The stopper 54 is formed in the carrier 10 and brought into contact with the rotary bar 51 which is bound to rotate in the opposite direction of the disk 20 to limit a rotation angle of the rotary bar 51.

Hereinafter, an operational process of the present invention having the foregoing configuration will be described.

In a state in which the user does not step on the brake pedal, the inner pad 31 and the outer pad 32 are spaced apart from the disk 20 as illustrated in FIG. 4.

In this state, when the user steps on the brake pedal, power is applied to the motor 44a and the shaft 44b rotates.

As the shaft 44b rotates, the connection unit 44c screw-coupled to the shaft 44b moves in the Y axis direction as illustrated in FIG. 5.

When the connection unit 44c moves in the Y axis direction, force is exerted on the wedge unit 42 coupled to the other end of the connection unit 44c in the Y axis direction.

Here, since the wedge unit 42 is in contact with the driving housing 43 through the first sloped surface 42a and the second sloped surface 43a, the wedge unit 42 moves in the X axis direction and Y axis direction, while moving on the second sloped surface 43a.

As the wedge unit 42 moves in the direction toward the disk 20, the inner pad 31 coupled to the wedge unit 42 is brought into contact with one surface of the disk 20.

Simultaneously, as the wedge unit 42 moves in the direction toward the disk 20, the link member 47 coupled to the wedge unit 42 also moves in the direction toward the disk 20 together with the wedge unit 42.

Figure 7A:
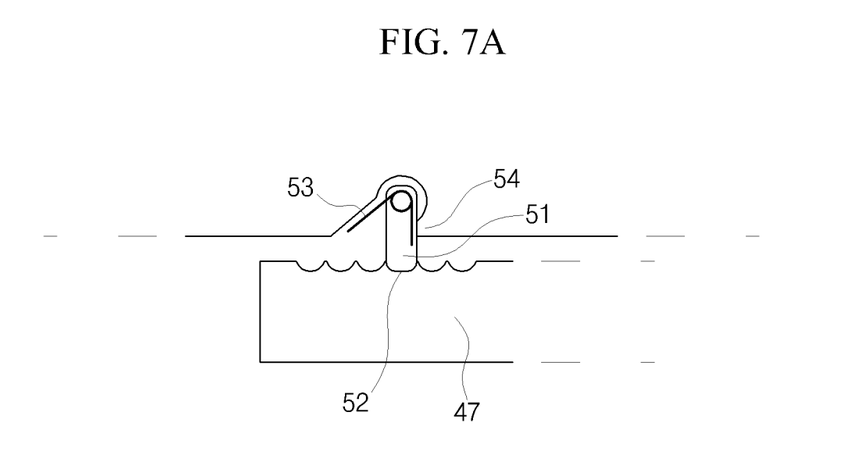
FIGS. 7A through 7D are plan views illustrating a process of operating a wear compensating unit according to a movement of a link member in an electro-mechanical brake having a wear compensation function according to an embodiment of the present invention.
Figure 7B:
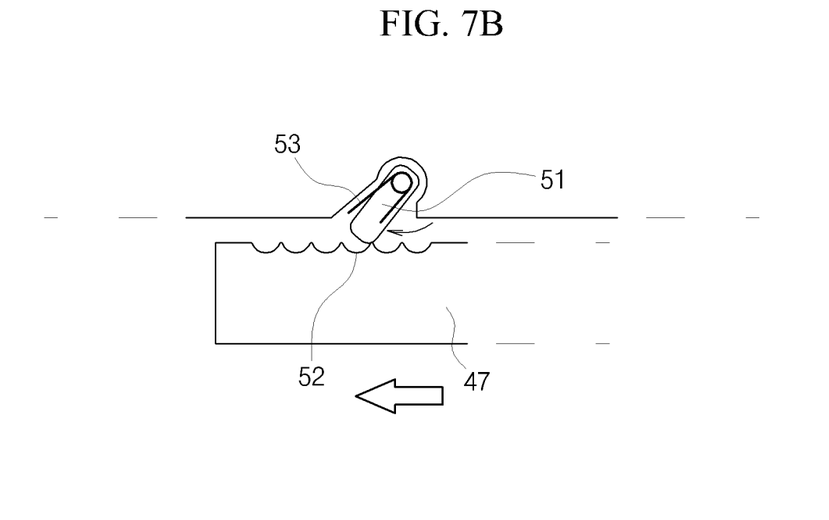

Here, as the link member 47 moves in the direction toward the disk 20, the rotary bar 51 which has been inserted in the insertion recess 52 in the other end thereof as illustrated in FIG. 7A rotates in the direction of the disk 20, while compressing the elastic member 53 as illustrated in FIG. 7B.

The state of the wear compensating unit 50 illustrated in FIG. 7B is identical to the state illustrated in FIG. 5.

Also, as the link member 47 moves in the direction toward the disk 20, the oval members 46 coupled to the other end of the link member 47 rotate about the rotation central axis coupled to the carrier 10.

When the oval members 46 rotate, the driving housing in contact with the oval members 46 move in the direction toward the disk 20 and one end of the caliper 45 moves in a direction away from the disk 20.

As the one end of the caliper 45 moves in the direction away from the disk 20, the other end of the caliper 45 disposed on the other side of the disk 20 moves in a direction toward the disk 20, and accordingly, the outer pad 32 is brought into contact with the other surface of the disk 20.

As the inner pad 31 and the outer pad 32 are brought into contact with both sides of the disk 20, the disk 20 is braked.

When the user does not step on the brake pedal, an operation is performed in a reverse manner to that of the foregoing operation according to a reverse rotation of the motor 44a, and thus, the inner pad 31 and the outer pad 32 are separated from the disk 20.

Here, the rotary bar 51, in a state in which the other end thereof is inserted into the insertion recess 52, is reversely rotated by elastic restoring force from the elastic member 52, changing from the state illustrated in FIG. 7B to the state illustrated in FIG. 7A, so as to be brought into contact with the stopper 54 and supported by the stopper 54.

As the pad unit 30 wears, a distance between the pad unit 30 and the disk 20 is gradually increased.

Thus, in order for the pad unit 30 to be brought into contact with the disk 20, the moving unit 40 coupled to the pad unit 30 needs to move significantly.

Namely, when the user steps on the brake pedal in a state in which the pad unit 30 wears, the link member 47 connected to the inner pad 31 through the wedge unit 42 moves in the direction toward the disk 20 by more than a predetermine distance.

Figure 7C:
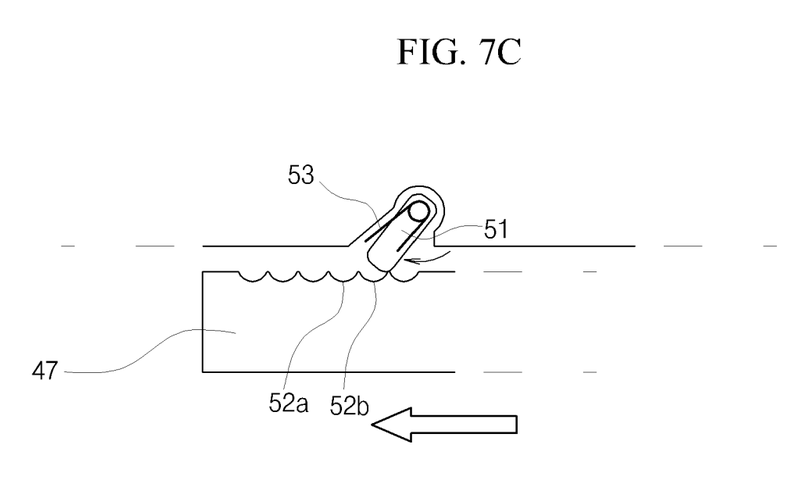

Due to the excessive movement of the link member 47, as illustrated in FIG. 7C, the other end of the rotary bar 51 moves out of a first insertion recess 52a and is inserted into a second insertion recess 52b and the disk 20 is braked according to the movement of the pad unit 30.

In this state, when the user does not step on the brake pedal, the link member 47 moves in a direction away from the disk 20 according to a reverse rotation of the motor 44a.

Figure 7D:
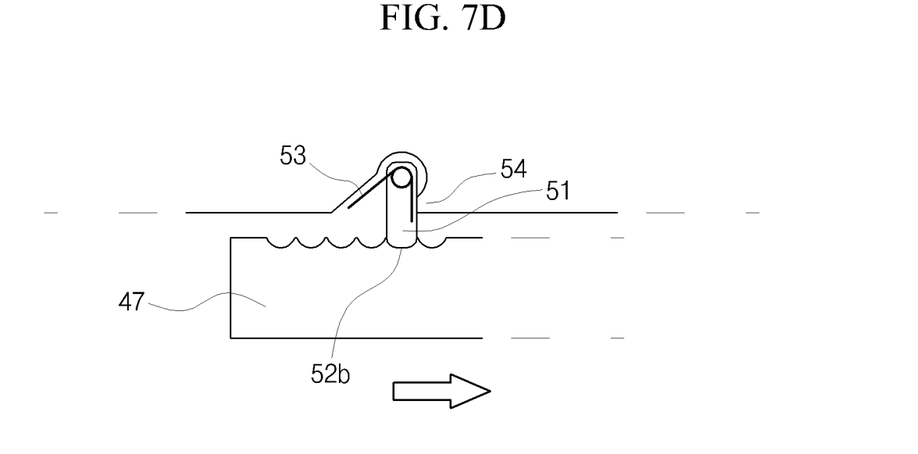

Here, as illustrated in FIG. 7D, the rotary bar 51, in a state in which the other end thereof is inserted into the second insertion recess 52b, is reversely rotated by elastic restoring force from the elastic member 53 so as to be brought into contact with the stopper 54, thus being restrained from rotating.

The state of the wear compensating unit 50 illustrated in FIG. 7D is identical to the state illustrated in FIG. 6.

Since the rotary bar 51 is inserted into the second insertion recess 52b and is in contact with the stopper 54, being restrained from reversely rotating, the link member 47 is caught by the rotary bar 51 and cannot move in the direction away from the disk 20 any further.

Accordingly, as illustrated in FIG. 6, the pad unit 30 and the moving unit 40 cannot move away from the disk 20 any further and a distance between the pad unit 30 and the disk 20 is maintained within the predetermined distance.

As described above, in the present invention, when the pad unit 30 wears, an amount of wear of the pad unit 30 is compensated for without unit a high-priced displacement sensor, whereby a distance between the pad unit 30 and the disk 20 can be maintained within the predetermined distance.

The EMB having the wear compensation function according to the present invention is not limited to the foregoing embodiment and may be variously modified to be implemented within the scope of the present invention.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An electro-mechanical brake having a wear compensation function, the electro-mechanical brake comprising:
    a carrier fixed to a vehicle body;
    a brake disk rotatably installed in a wheel of a vehicle;
    a pad unit including an inner pad disposed on one side of the disk and an outer pad disposed on the other side of the disk;
    a moving unit configured to move the pad unit in a direction toward the disk; and
    a wear compensating unit installed between the carrier and the moving unit and configured to move the pad unit in the direction toward the disk through the moving unit when the pad unit wears, and maintain the corresponding state,
    wherein a distance between the pad unit and the disk is maintained within a predetermined distance by the wear compensating unit
    wherein the moving unit comprises:
    a driving unit disposed such that one end thereof is coupled to the inner pad and moving the inner pad in a direction toward where the disk is disposed;
    a caliper disposed such that one end thereof is spaced apart from the other end of the driving unit, and that the other end thereof is coupled to the outer pad;
    oval members disposed between the other end of the driving unit and the one end of the caliper and rotatably coupled to the carrier; and
    a link member having one end coupled to the oval members and the other end coupled to the driving unit.

2. The electro-mechanical brake of claim 1, wherein when the inner pad is moved by the driving unit in the direction toward the disk, the link member moves together with the inner pad in the direction toward the disk to rotate the oval members.

3. The electro-mechanical brake of claim 2, wherein the caliper moves the outer pad in the direction toward the disk according to the rotation of the oval members.

4. The electro-mechanical brake of claim 3, wherein the driving unit comprises:
    a wedge unit having a first sloped surface formed on one surface thereof and the other surface coupled to the inner pad;
    a driving housing having one surface in contact with the oval members and a second sloped surface formed on the other surface thereof and being in contact with the first sloped surface of the wedge unit; and
    a power generating unit installed in the driving housing and configured to enable the wedge unit to move on the second sloped surface.

5. The electro-mechanical brake of claim 4, wherein the other end of the link member is coupled to the wedge unit, and when the wedge unit moves on the second sloped surface in the direction toward the disk, the link member moves together with the wedge unit in the direction toward the disk.

6. The electro-mechanical brake of claim 5, wherein the power generating unit comprises:
    a motor installed in the driving housing;
    a shaft coupled to a rotational shaft of the motor and having a thread formed on an outer circumferential surface thereof; and a connection unit connected to the wedge unit in one end thereof and screw-coupled to the shaft in the other end thereof.

7. The electro-mechanical brake of claim 6, wherein when the shaft is rotated by the motor, the connection unit moves along the shaft.

8. The electro-mechanical brake of claim 7, wherein, according to the movement of the connection unit, the wedge unit moves on the second sloped surface in the movement direction of the connection unit and simultaneously moves in the direction toward the disk.

9. The electro-mechanical brake of claim 3, wherein one end of the link member is coupled to a position eccentric from the center of the oval members.

10. The electro-mechanical brake of claim 3, wherein the wear compensating unit is disposed between the carrier and the link member and, when the pad unit wears, the wear compensating unit maintains a state in which the driving unit and the pad unit has moved in the direction of the disk, through the link member which has moved in the direction of the disk.

11. The electro-mechanical brake of claim 10, wherein when the link member has moved in the direction of the disk by more than a predetermined distance, the wear compensating unit restrains the link member from moving in the opposite direction of the disk.

12. The electro-mechanical brake of claim 11, wherein the wear compensating unit comprises:
   a rotary bar rotatably coupled to the carrier in one end thereof;
   a plurality of insertion holes formed on the link member and allowing the other end of the rotary bar to be inserted thereinto;
   a stopper configured to limit a rotation angle of the rotary bar which rotates in the opposite direction of the disk.

13. The electro-mechanical brake of claim 12, further comprising an elastic member applying rotary power to the rotary bar in the opposite direction of the disk.

14. The electro-mechanical brake of claim 13, wherein when the link member has moved in the direction of the disk by more than the predetermined distance, the other end of the rotary bar is inserted into a corresponding insertion recess and supported by the stopper to restrain the link member from moving in the opposite direction of the disk.

15. The electro-mechanical brake of claim 13, wherein the elastic member is a torsion spring.

* * * * *